(12) United States Patent
Bader et al.

(10) Patent No.: US 9,587,685 B2
(45) Date of Patent: Mar. 7, 2017

(54) METHOD AND DEVICE FOR DETERMINATION A TOUCH POINT OF A FRICTION CLUTCH

(71) Applicant: ZF Friedrichshafen AG, Friedrichshafen (DE)

(72) Inventors: Martin-Joachim Bader, Mochenwangen (DE); Karl Locher, Pfronstetten-Tigerfeld (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 686 days.

(21) Appl. No.: 13/714,554

(22) Filed: Dec. 14, 2012

(65) Prior Publication Data

US 2013/0158825 A1 Jun. 20, 2013

(30) Foreign Application Priority Data

Dec. 19, 2011 (DE) ........................ 10 2011 089 031

(51) Int. Cl.
*F16D 48/06* (2006.01)

(52) U.S. Cl.
CPC ...... *F16D 48/06* (2013.01); *F16D 2500/1045* (2013.01); *F16D 2500/10412* (2013.01); *F16D 2500/50233* (2013.01); *F16D 2500/50245* (2013.01); *F16D 2500/50251* (2013.01); *F16D 2500/70605* (2013.01)

(58) Field of Classification Search
CPC ......... G06F 19/00; B60K 41/02; B60K 41/28; F16D 13/69; F16D 13/75
See application file for complete search history.

(56) References Cited

U.S. PATENT DOCUMENTS

| | | | | |
|---|---|---|---|---|
| 4,260,048 A | * | 4/1981 | Beccaris | 192/107 C |
| 5,337,866 A | * | 8/1994 | Sturmer et al. | 477/175 |
| 5,337,874 A | * | 8/1994 | Oltean et al. | 192/70.252 |
| 5,393,274 A | * | 2/1995 | Smedley | 477/74 |
| 5,954,178 A | | 9/1999 | Fischer et al. | |
| 8,271,171 B2 | | 9/2012 | Terwart et al. | |
| 2004/0238311 A1 | * | 12/2004 | Parigger | 192/84.6 |
| 2010/0268428 A1 | * | 10/2010 | Ellis | 701/67 |

FOREIGN PATENT DOCUMENTS

| | | |
|---|---|---|
| DE | 197 00 935 A1 | 8/1997 |
| DE | 10 2006 042 356 A1 | 3/2008 |
| DE | 10 2008 043 384 A1 | 5/2010 |
| WO | 98/54483 A2 | 12/1998 |
| WO | 2008/028817 A1 | 3/2008 |

OTHER PUBLICATIONS

German Search Report Corresponding to DE 10 2011 089 031.9.

* cited by examiner

*Primary Examiner* — Mussa A Shaawat
*Assistant Examiner* — Kelly D Williams
(74) *Attorney, Agent, or Firm* — Davis & Bujold, PLLC; Michael J. Bujold

(57) ABSTRACT

A method of determining a touch-point of a friction clutch of a motor vehicle that is relevant for control purposes such that a current, actual touch-point of the friction clutch is determined adaptively, and such that the current touch-point is modified, with a correction value that depends on the elasticity of the friction clutch, in order to determine the control-relevant touch-point. The control device comprises elements for carrying out the method.

11 Claims, 3 Drawing Sheets

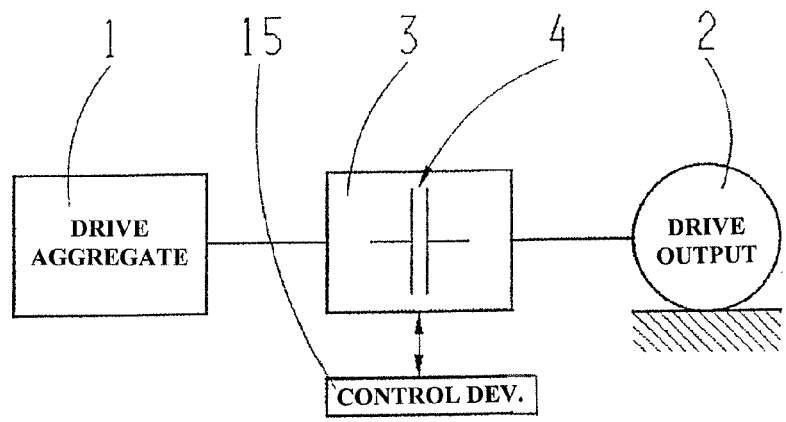
PRIOR ART   Fig. 1
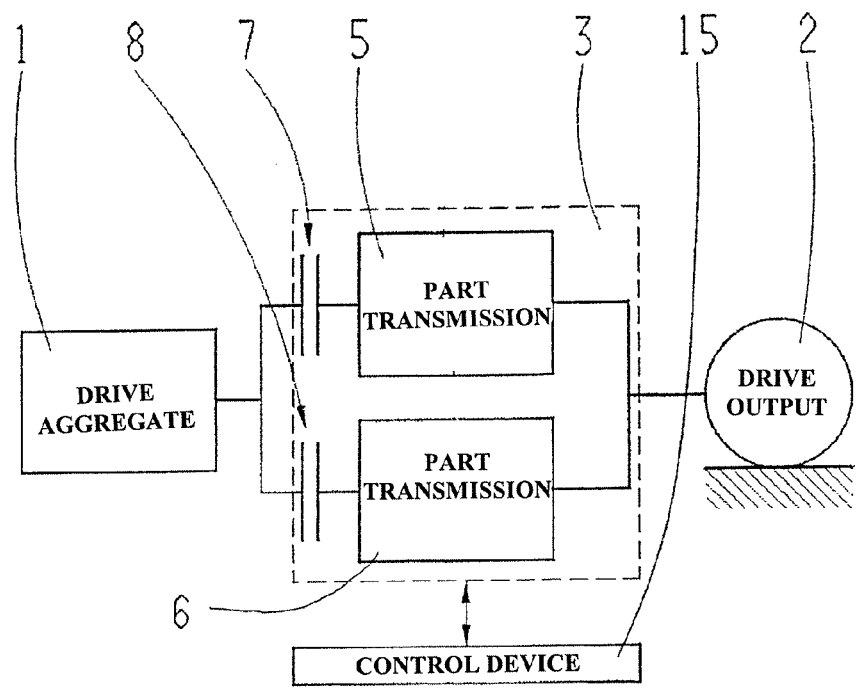
PRIOR ART   Fig. 2

METHOD AND DEVICE FOR DETERMINATION A TOUCH POINT OF A FRICTION CLUTCH

This application claims priority from German patent application serial no. 10 2011 089 031.9 filed Dec. 19, 2011.

FIELD OF THE INVENTION

The invention concerns a method for determining a touch-point of a friction clutch that is relevant for control purposes. Furthermore, the invention concerns a control device in a motor vehicle for determining the control-relevant touch-point of a friction clutch.

BACKGROUND OF THE INVENTION

In motor vehicles automatic or automated transmissions are used more and more often. In such transmissions automated friction force locking clutches and in some cases automated interlocking clutches are used; the present invention concerns automated friction force locking clutches, also referred to as automated friction clutches.

To ensure comfortable and low-wear operation of an automated friction clutch, it is necessary to have as accurate as possible a knowledge of the relationship between a control parameter and a torque transmitted by the friction clutch. The control parameter can be, for example, a so-termed clutch pressure by which the friction clutch is actuated to close or open it. Typically, the relationship between a control parameter and the torque is stored in a control unit of the motor vehicle in the form of a characteristic torque curve as a function of the control parameter, for example as a function of the clutch pressure, as for example in a transmission control unit of the motor vehicle, and during operation the friction clutch is actuated on the basis of such a torque characteristic.

An essential parameter or reference point of a torque characteristic of an automated friction clutch is the so-termed touch-point. The touch-point is also referred to as the contact point or engagement point or feel-point of the friction clutch.

The touch-point of the torque characteristic of an automated friction clutch is understood to be a reference point at which, in a clutch actuated in the engagement or closing direction, friction elements of the friction clutch just come into contact so that the friction clutch just begins transmitting a minimal torque, and at which, when the clutch is actuated in the disengagement or opening direction, the friction elements of the friction clutch are just separated so that the frictional transmission of a torque by the friction clutch is just interrupted.

During the operation of the friction clutch, as a result of clutch wear the touch-point of the friction clutch can change. Moreover, in the mass production of friction clutches with the same structure, because of manufacturing tolerances the touch-points of individual friction clutches can differ from one another.

In order nevertheless to ensure the comfortable and low-wear operation of an automated friction clutch, from the prior art it is already known to determine the touch-point of a friction clutch adaptively. DE 10 2008 043 384 A1, for example, describes such a method for the adaptive determination of a current, actual touch-point of a friction clutch.

According to the prior art, the current touch-point determined adaptively in this way is used as the control-relevant touch-point. From the prior art it is also known to determine a control-relevant touch-point from an adaptively determined current touch-point by modifying the adaptively determined current touch-point with a constant offset value. This constant offset value is also referred to as the fine-adaptation value.

SUMMARY OF THE INVENTION

Starting from there the purpose of the present invention is to provide a new type of method for determining a control-relevant touch-point of an automated friction clutch and a new type of control device of a motor vehicle for determining a control-relevant touch-point of an automated friction clutch.

This objective is achieved by a method according to the invention. in order to determine the control-relevant touch-point of the friction clutch, the current, actual touch-point is modified with a correction value that depends on the elasticity of the friction clutch.

With the present invention it is proposed for the first time to modify the adaptively determined current touch-point of an automated friction clutch with a correction value that depends on the elasticity of the friction clutch, in order to determine in that way the control-relevant touch-point of the friction clutch. This makes it possible for the first time to take into account, in the determination of the control-relevant touch-point, variations of the rigidity or elasticity of the automated friction clutch brought about by manufacturing tolerances. This results in substantially more comfortable and low-wear operation of an automated friction clutch.

Preferably, the correction value is determined adaptively as a function of the adaptively determined, current touch-point of the automated friction clutch and as a function of an adaptively determined inflection point of the automated friction clutch. If the correction value is determined as a function of the adaptively determined, current touch-point of the friction clutch and as a function of the adaptively determined inflection point of the automated friction clutch, then the correction value can be determined adaptively in a particularly advantageous manner.

Besides the touch-point, the so-termed inflection point of the automated friction clutch is a further reference point of the torque characteristic of the automated friction clutch, such that the inflection point is understood to be a reference point of the torque characteristic where a defined change of the parameter, for example the clutch pressure, brings about a defined torque change of the torque transmitted by the friction clutch. Thus, at the inflection point the torque characteristic has a defined gradient.

When the clutch behavior of an automated friction clutch is relatively elastic, the inflection point is a relatively large distance away from the touch-point in the torque characteristic, while in contrast if the clutch behavior is relatively rigid the inflection point is a relatively small distance away from the touch-point in the torque characteristic of the friction clutch.

According to a first advantageous further development of the invention, the correction value is determined as a function of a difference between the adaptively determined, current touch-point of the automated friction clutch and the adaptively determined inflection point of the automated friction clutch. In this case the adaptively determined, current touch-point modified with the adaptive correction value is taken as the control-relevant touch-point. If the difference between the adaptively determined, current touch-point of the friction clutch and the adaptively determined inflection point of the friction clutch is negative, a positive correction value is used, which is larger, the greater the negative difference is. If the difference between the adaptively determined, current touch-point of the friction clutch and the adaptively determined inflection point of the friction clutch is positive, a negative correction value is used, which is larger, the greater the positive difference is.

In a second, alternative advantageous further development of the invention, the correction value is determined as a function of the difference between the current touch-point of the automated friction clutch determined adaptively by modification with a constant offset value and the adaptively determined inflection point of the automated friction clutch. In this case the current touch-point determined adaptively by modification with the adaptive correction value and the constant offset value is taken as the control-relevant touch-point. If the difference between the current touch-point of the friction clutch determined adaptively by modification with the constant offset value and the adaptively determined inflection point of the friction clutch is negative and quantitatively relatively large, a positive correction value is determined, which is larger, the greater the negative difference is. If the difference between the current touch-point of the friction clutch determined adaptively by modification with the constant offset value and the adaptively determined inflection point of the friction clutch is positive and quantitatively relatively large, a negative correction value is determined, which is larger, the greater the positive difference. If the difference between the current touch-point of the friction clutch determined adaptively by modification with the constant offset value and the adaptively determined inflection point of the friction clutch is relatively small, no correction value or a correction value equal to zero is determined.

According to the first advantageous further development of the invention, the adaptive correction value serves for the adjustment or correction of the adaptively determined, current touch-point, and the touch-point adaptively determined by modification with the adaptive correction value is used as the control-relevant touch-point. According to the second advantageous further development of the invention, the adaptive correction value serves for the adjustment or correction of the constant offset value, and the touch-point adaptively determined by modification with the adaptive correction value and the constant offset value is used as the control-relevant touch-point.

BRIEF DESCRIPTION OF THE DRAWINGS

Preferred further developments of the invention emerge from the description given below. Example embodiments of the invention, to which it is not limited, are explained in more detail with reference to the drawings, which show:

FIG. 1: An example layout of a drive-train of a motor vehicle;

FIG. 2: A further example layout of a drive-train of a motor vehicle;

DETAILED DESCRIPTION OF THE PREFERRED EMBODIMENTS

Figure 3:
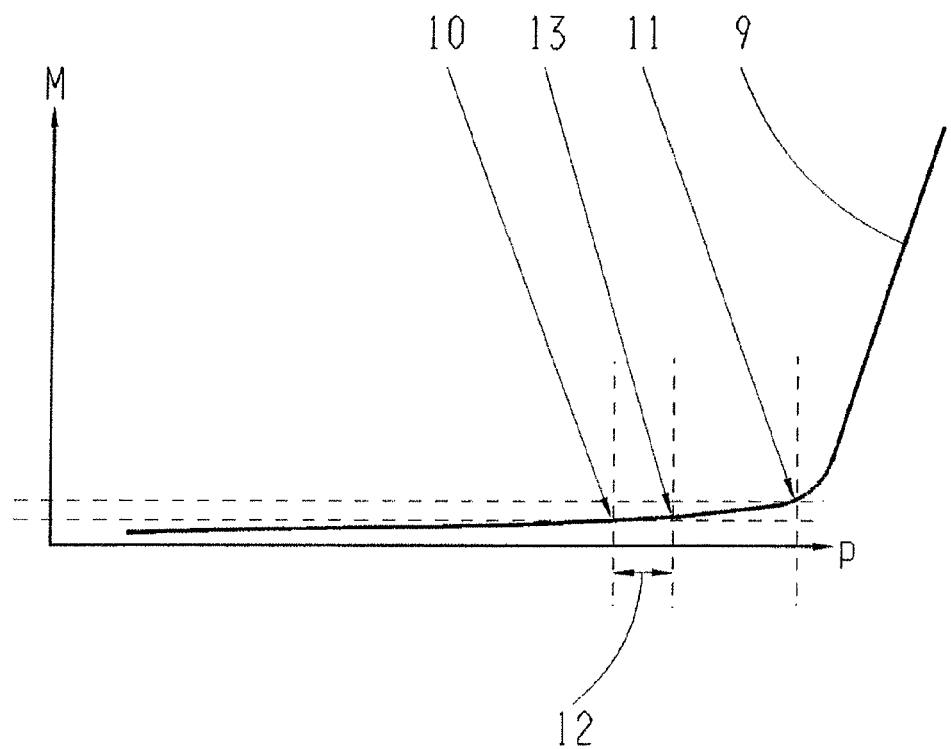
FIG. 3: A diagram to illustrate the prior art.

FIGS. 1 and 2 show drive-train layouts of a motor vehicle known from the prior art. Thus, the drive-train of FIG. 1 has a drive aggregate 1 and a transmission 3 connected between the drive aggregate 1 and a drive output 2, wherein the transmission 3 can be in the form of an automatic or an automated standard transmission. The automated transmission 3 comprises at least one automated friction clutch 4, which can be used as a shifting element and if necessary as a starting element. FIG. 2 shows another layout of a drive-train of a motor vehicle, such that in the drive-train layout of FIG. 2 a transmission 3 in the form of a dual-clutch transmission is connected between the drive aggregate 1 and the drive output 2, the dual-clutch transmission having two part-transmissions 5 and 6 with friction clutches associated with the part-transmissions. The drive-train layouts of FIGS. 1 and 2 are shown only as examples and, with reference to these two example drive-train layouts, they illustrate possible fields of application of automated friction clutches. The operation of the respective transmission 3 and thus also of the, or of each friction clutch 4, 7, 8 is controlled by a control device 15, namely a transmission control device.

An automated friction clutch is characterized by a so-termed torque characteristic, and FIG. 3 shows an example of a torque characteristic 9 of a friction clutch in which a torque M transmitted by the friction clutch is plotted as a function of a control parameter, namely in FIG. 3, a clutch pressure p. In the torque characteristic 9 of FIG. 3 two characteristic reference points are indicated, namely an adaptively determined, current touch-point 10 of the automated friction clutch and an adaptively determined inflection point 11.

The touch-point 10 is also referred to as the contact point or touch point or engagement point or feel-point, and is such that at the touch-point 10 of the automated friction clutch, frictional elements of a clutch actuated in the engagement or closing direction just come into contact and transmit a minimal torque, whereas in contrast, the frictional elements of a friction clutch actuated in the disengagement or opening direction are just separated so that the frictional transmission of the torque by the friction clutch just ends or is interrupted.

The inflection point 11 of the friction clutch is a reference point of the torque characteristic 9 at which a defined change of the clutch pressure produces a defined torque change of the torque transmitted by the clutch, from which it follows that at the inflection point 11 the torque characteristic 9 has a defined gradient.

Compared with the touch-point 10, the inflection point 11 of the friction clutch or its torque characteristic occurs at a higher value of the control parameter, so that for a clutch closed beyond the touch-point 10 the inflection point 11 is higher. So to speak, the inflection point 11 defines a transition from elastic clutch behavior to rigid clutch behavior of the friction clutch or its torque characteristic 9, such that during elastic clutch behavior a relatively small increase of the clutch torque M transmitted requires a relatively large increase of the control parameter, specifically the clutch pressure p, whereas in contrast during rigid clutch behavior a relatively small change of the control parameter, specifically the clutch pressure p, results in a relatively large change of the torque M transmitted.

The adaptive determination of the touch-point 10 of an automated friction clutch or of the torque characteristic 9 of an automated friction clutch is already known from DE 10 2008 043 384 A1. Likewise, a person with knowledge of the subject will be familiar with the adaptive determination of the inflection point 11.

An adaptively determined, current touch-point 10 can be used in a control device, for example a transmission control unit of the motor vehicle, as the control-relevant touch-point. FIG. 3 also makes it clear that it is also known from the prior art to modify the adaptively determined, current touch-point 10 with a constant offset value 12 in order to calculate, by modifying the adaptively determined touch-point 10 with the constant offset value 12, a control-relevant touch-point 13. This constant offset value can also be referred to as the fine adaptation value.

According to the invention, the current touch-point 10 determined by adaptation is modified with a correction value that depends on the elasticity of the friction clutch, in order to determine the touch-point of the friction clutch that is relevant for control purposes. The control-relevant touch-point is the reference point of the friction clutch that the control unit uses for controlling the friction clutch.

The correction value is preferably determined as a function of the adaptively determined, current touch-point of the friction clutch and as a function of an adaptively determined inflection point of the friction clutch.

Particulars concerning this are described in detail below with reference to FIG. 4 in which, as examples, two torque characteristics 9a, 9b of friction clutches are shown, whose adaptively determined current touch-point 10 coincides.

Figure 4:
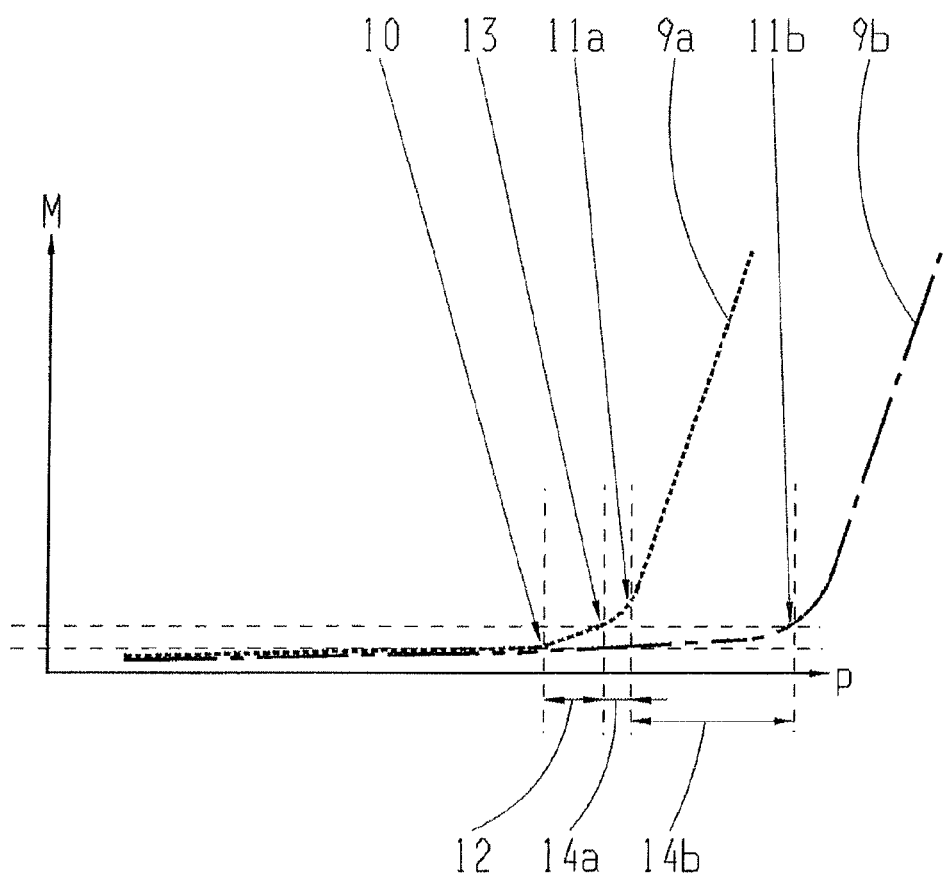
FIG. 4: A diagram to illustrate the invention.

FIG. 4 also shows that this adaptively determined current touch-point 10 has been modified with a constant offset value 12 identical for both torque characteristics 9a, 9b, which thus leads to an adapted touch-point 13 which is again identical for both torque characteristics 9a, 9b.

Furthermore, FIG. 4 shows adaptively determined inflection points 11a, 11b respectively for the two torque characteristics 9a, 9b, such that in the case of a more rigid friction clutch with the torque characteristic 9a, the inflection point 11a is closer to the touch-point 10 and the adapted touch-point 13 than is the inflection point 11b of a relatively elastic clutch with the torque characteristic 9b.

According to FIG. 4 there is a difference between the touch-point 10 modified with the constant offset value 12, i.e. the adapted touch-point 13, and the adaptively determined inflection point of the friction clutch. For the two inflection points 11a and 11b, FIG. 4 shows the respective two differences 14a and 14b to the adapted touch-point 13 determined by modifying the adaptively determined touch-point 10 with the constant offset value 12.

If the difference 14a or 14b between the adaptive touch-point 10 modified with the constant offset value 12, namely the adapted touch-point 13, and the inflection point 11a or 11b is negative and quantitatively relatively large, then a positive correction value is determined, which is larger, the greater the size of the negative difference is.

This is the case in FIG. 4 for both characteristics 9a, 9b, since in the figure the adapted touch-point 13 obtained by modifying the adaptively determined touch-point 10 with the constant offset 12 is, in each case, to the left of the inflection point 11b in both torque characteristics 9a and 9b. In FIG. 4, however, the negative difference 14b for torque characteristic 9b is quantitatively larger than the negative difference 14a for torque characteristic 9a.

If the respective difference 14a or 14b between the adapted touch-point 13 and the inflection point 11a or 11b of the friction clutch or torque characteristic is positive and relatively large, a negative correction value is determined, which is larger, the greater the positive difference is.

In contrast, if the quantitative difference between the adapted touch-point 13 and the inflection point 11a or 11b of the friction clutch or torque characteristic is relatively small, then no correction value or a correction value equal to zero is determined.

As the touch-point relevant for control purposes, the current touch-point modified with the correction value and the constant offset value is used, from which it follows that in the preferred embodiment of the invention according to FIG. 4, the control-relevant touch-point depends on the adaptively determined, current touch-point 10, the constant offset value 12 and the adaptive correction value which is determined from the difference 14a or 14b between the current touch-point 10 of the friction clutch modified with the constant offset value 12 and the adaptively determined inflection point 11a or 11b of the friction clutch.

As a difference from the variant shown in FIG. 4, in which the adaptively determined current touch-point 10 is modified with the constant offset value 12, it is also possible to determine a correction value that depends on the elasticity of the friction clutch independently of a difference between the adaptively determined, current touch-point of the friction clutch and the adaptively determined inflection point of the friction clutch. In this case, if the difference is negative a positive correction value is defined, which is larger, the quantitatively greater the negative difference is, whereas if the difference is positive, a negative correction value is defined, which is larger, the greater the positive difference is. As the control-relevant touch-point, the adaptively determined touch-point modified with the adaptive correction value is then used.

According to the invention it is thus proposed to determine a control-relevant touch-point of a torque characteristic of a friction clutch as a function of a correction value that depends on the elasticity or rigidity of the clutch. This correction value is preferably determined adaptively, namely as a function of the adaptively determined touch-point and an adaptively determined inflection point. As a difference from this, it is also possible to define the correction value on the basis of an elasticity or rigidity of the specific friction clutch determined in advance by measurement. However, since determining the elasticity or rigidity of a friction clutch by measurement is an elaborate and costly process, the adaptive definition of the correction value by way of the adaptively determined inflection point of the friction clutch is preferred.

The concrete, numerical definition of the correction value determined as a function of a difference between the adaptively determined, current touch-point of the friction clutch and the adaptively determined inflection point, or as a function of the difference between the adaptively determined touch-point modified with the constant offset value and the adaptively determined inflection point, can take place for example by way of a characteristic curve which, for example, has a number of support points. Between the individual support points of such a characteristic, the correction value can be determined by interpolation.

The invention ensures that the control-relevant touch-point is a defined distance away from the inflection point and hence from the transition from elastic to rigid clutch behavior. In this way the response behavior of a clutch is substantially reduced and the pressure-following behavior of the friction clutch is substantially improved. Ultimately, a more comfortable and lower-wear operation of an automated friction clutch can be ensured thereby.

A control device 15 of a motor vehicle for determining a touch-point of a friction clutch that is relevant for control purposes, is preferably in the form of a transmission control unit and comprises means for modifying the current touch-point with the correction value that depends on the elasticity of the friction clutch in order to determine the control-relevant touch-point of the friction clutch.

Particularly when the correction value that depends on the elasticity of the friction clutch is determined adaptively, the control device 15 according to the invention also comprises means for the adaptive determination of the current touch-point of the friction clutch, means for the adaptive determination of the inflection point of the friction clutch and in addition means for the adaptive determination of the correction value as a function of a difference between the adaptively determined current touch-point of the friction clutch and the adaptively determined inflection point of the friction clutch, or as a function of the difference between the adaptively determined touch-point of the friction clutch modified with the constant offset value stored in the control device 15 and the adaptively determined inflection point of the friction clutch.

The above means in the control device 15 include in particular a memory, a processor, and interfaces of an electronic control device, such that the electronic control device exchanges data with the transmission 3 or the automated friction clutches 4, 7, 8 or with actuators and sensors of the automated friction clutches 4, 7, 8.

INDEXES

1 Drive aggregate
2 Drive output
3 Transmission
4 Friction clutch
5 Part-transmission
6 Part-transmission
7 Friction clutch
8 Friction clutch
9 Torque characteristic
9*a* Torque characteristic
9*b* Torque characteristic
10 Adaptively determined touch-point
11 Adaptively determined inflection point
11*a* Adaptively determined inflection point
11*b* Adaptively determined inflection point
12 Offset value
13 Adaptively determined touch-point modified by the offset value
14*a* Difference
14*b* Difference
15 Control device

The invention claimed is:

1. A method of determining a touch-point of a friction clutch of a motor vehicle, with the touch-point being relevant for control purposes, such that a current actual touch-point of the friction clutch is determined adaptively, the method comprising the steps of:
   modifying, with a control device, the current touch-point with a correction value that depends on an elasticity of the friction clutch in order to determine a control-relevant touch-point; and
   defining the elasticity of the friction clutch as a function of a relative difference between a value of the current touch-point on a characteristic curve and a value of an inflection point of the friction clutch on the characteristic curve, the friction clutch being more elastic, the greater the relative difference is, and the friction clutch being less elastic, the smaller the relative difference is.

2. The method according to claim 1, further comprising the step of determining, with the control device, the correction value adaptively as a function of the current touch-point of the friction clutch and as a function of the inflection point of the friction clutch, the inflection point of the friction clutch being a point on the characteristic torque curve between the current touch-point of the friction clutch and a point on the characteristic torque curve prior to full clutch engagement, and the inflection point of the friction clutch being a point at which a defined change of clutch pressure results in a defined change of torque transmitted by the friction clutch.

3. The method according to claim 2, further comprising the step of defining the inflection point of the friction clutch as a point on the characteristic curve at which the friction clutch transitions from elastic to rigid clutch behavior.

4. The method according to claim 3, further comprising the step of defining a positive correction value, if the difference between the current touch-point of the friction clutch and the inflection point of the friction clutch is negative, then a value of the positive correction increases as a quantitative value of the negative difference increases, and
   defining a negative correction value, if the difference between the current touch-point of the friction clutch and the inflection point of the friction clutch is positive, then a quantitative value of the negative correction increases as the value of the positive difference increases.

5. The method according to claim 3, further comprising the step of defining the current touch-point modified with the adaptive correction value as the touch-point that is relevant for control purposes.

6. The method according to claim 2, further comprising the step of determining the correction value as a function of a difference between the current touch-point if the friction clutch, modified with a constant offset value, and the inflection point of the friction clutch, the inflection point being a reference point at which the change in clutch pressure in relation to the change in torque transmitted by the friction clutch has a defined gradient.

7. The method according to claim 6, further comprising the step of defining a positive correction value if the difference is negative and a value of the positive correction value being larger, the quantitatively greater the negative difference is, and defining a negative correction value if the difference is positive and a value of the negative correction value is quantitatively larger, the greater the positive difference; and
   defining the correction value as being equal to zero if the difference is quantitatively relatively small.

8. The method according to claim 6, further comprising the step of modifying the current touch-point modified with the adaptive correction value and defining the constant offset value as the control-relevant touch-point.

9. A control device of a motor vehicle for determining a control-relevant touch-point of a friction clutch of the motor vehicle, having a determining means for adaptive determination of a current touch-point of the friction clutch, and for modifying the current touch-point with a correction value that depends on an elasticity of the friction clutch for determining the control-relevant touch-point of the friction clutch, the elasticity of the friction clutch being defined as a relative difference between a value of the current touch-point on a characteristic curve and a value of an inflection point of the friction clutch on the characteristic curve, the friction clutch being more elastic, the greater the relative difference is, and the friction clutch being less elastic, the smaller the relative difference is.

10. The control device according to claim 9, wherein the control device carries out a method for determining the touch-point of the friction clutch of the motor vehicle, the touch-point being relevant for control purposes, such that the current actual touch-point of the friction clutch is determined adaptively, the method comprising the steps of modifying the current touch-point with a correction value that depends on the elasticity of the friction clutch in order to determine the control-relevant touch-point.

11. A method of determining a touch-point of a friction clutch of a motor vehicle that is relevant for control purposes, the method comprising the steps of:
   determining a correction value, with an electronic control unit, depending on an elasticity of the friction clutch, the elasticity of the friction clutch being an amount of torque transferred through the friction clutch in relation to a change in pressure of the friction clutch;
   defining the elasticity of the friction clutch as being a relative difference between an amount of pressure of the friction clutch at the touch point of the friction clutch and an amount of pressure of the friction clutch prior to full engagement thereof;
   modifying, with the electronic control unit, a current actual touch-point of the friction clutch with the correction value; and
   defining, with the electronic control unit, the modified current actual touch-point as being a control-relevant touch-point.

* * * * *